US011787415B2

(12) United States Patent
Smith et al.

(10) Patent No.: US 11,787,415 B2
(45) Date of Patent: Oct. 17, 2023

(54) METHOD AND SYSTEM OF ANTI-CIRCUMVENTION MONITORING IN VEHICLE IGNITION INTERLOCK OPERATION (71) Applicant: Consumer Safety Technology, LLC, Des Moines, IA (US)

(72) Inventors: David Livingston Smith, Des Moines, IA (US); Carol A. Vokes, Adel, IA (US); Jennifer Johnson, West Des Moines, IA (US); Brian Clark, Ankeny, IA (US)

(73) Assignee: Consumer Safety Technology, LLC, Des Moines, MN (US)

( * ) Notice: Subject to any disclaimer, the term of this patent is extended or adjusted under 35 U.S.C. 154(b) by 0 days.

(21) Appl. No.: 17/960,010

(22) Filed: Oct. 4, 2022

(65) Prior Publication Data

US 2023/0022836 A1    Jan. 26, 2023

Related U.S. Application Data (63) Continuation of application No. 17/217,572, filed on Mar. 30, 2021.

(51) Int. Cl.
*B60W 40/08* (2012.01)
*G07C 9/00* (2020.01)
*B60L 58/12* (2019.01)

(52) U.S. Cl.
CPC ............ *B60W 40/08* (2013.01); *B60L 58/12* (2019.02); *G07C 9/00182* (2013.01); *B60W 2040/0836* (2013.01); *G07C 2009/00285* (2013.01)

(58) Field of Classification Search
CPC ......... B60W 40/08; B60W 2040/0836; B60W 2050/0295; B60W 2556/45;
(Continued)

(56) References Cited

U.S. PATENT DOCUMENTS 4,912,458 A * 3/1990 Comeau ............... B60K 28/063
                                                    340/576
5,426,415 A    6/1995 Prachar et al.
(Continued)

FOREIGN PATENT DOCUMENTS

CA      2366341        5/2010
WO    1995026889      10/1995

OTHER PUBLICATIONS

Smart Start Lockout Code Instructions Customer Form (Year: 2019).*

(Continued)

*Primary Examiner* — Fadey S. Jabr
*Assistant Examiner* — Faris Asim Shaikh
(74) *Attorney, Agent, or Firm* — Pauly, DeVries Smith & Deffner LLC (57) ABSTRACT A method of monitoring for circumvention of an ignition interlock system is described herein including detecting an electrical parameter associated with an electrical power state of a vehicle electrical system in a vehicle comprising an ignition interlock device that includes at least a relay device and a controller device electrically interconnected within the vehicle electrical system, measuring a rate of degradation associated with the electrical parameter of the vehicle electrical system, and comparing the electrical parameter to a threshold condition. The method further includes comparing the rate of degradation of the electrical parameter to a threshold rate. Depending on the rate of degradation, a violation state may be generated, a violation state may be reversed, a violation state may be maintained, a log entry may be generated, or more than one of these may occur.

20 Claims, 6 Drawing Sheets (58) Field of Classification Search
CPC .............. B60W 50/0098; B60L 58/12; B60L 2240/547; B60L 2240/549; B60L 3/04; B60L 3/0046; G07C 9/00182; G07C 2009/00285; B60K 28/063; B60R 25/007
See application file for complete search history.

(56) References Cited

U.S. PATENT DOCUMENTS

| | | | |
|---|---|---|---|
| 6,167,746 | B1 | 1/2001 | Gammenthaler |
| 6,853,956 | B2 | 2/2005 | Ballard et al. |
| 6,930,466 | B2 | 8/2005 | Bradley et al. |
| 6,956,484 | B2 | 10/2005 | Crespo et al. |
| 7,135,788 | B2 | 11/2006 | Metlitzky et al. |
| 8,078,334 | B2 | 12/2011 | Goodrich |
| 8,957,771 | B2 | 2/2015 | Arringdale et al. |
| 9,442,103 | B1 | 9/2016 | Goad |
| 9,481,245 | B2 | 11/2016 | Nelson et al. |
| 9,707,845 | B1 | 7/2017 | Nienhouse |
| 9,908,488 | B2 | 3/2018 | Shafer |
| 10,919,389 | B2 | 2/2021 | Devries et al. |
| 11,047,840 | B2 | 6/2021 | Devries et al. |
| 2007/0257642 | A1 | 11/2007 | Xiao et al. |
| 2010/0314190 | A1 | 12/2010 | Zimmermann et al. |
| 2011/0148626 | A1 | 6/2011 | Acevedo |
| 2012/0112879 | A1 | 5/2012 | Ekchian et al. |
| 2012/0194141 | A1 | 8/2012 | Shi et al. |
| 2013/0177826 | A1* | 7/2013 | Harris ............... H01M 8/04955 429/428 |
| 2014/0253102 | A1* | 9/2014 | Wood .................... G01R 11/25 324/140 R |
| 2015/0197151 | A1 | 7/2015 | Ballard |
| 2015/0212063 | A1* | 7/2015 | Wojcik ................ G06V 40/167 340/576 |
| 2015/0244452 | A1 | 8/2015 | Wojciech et al. |
| 2016/0086021 | A1 | 3/2016 | Grohman et al. |
| 2016/0162849 | A1* | 6/2016 | Matsuyama ........... B60L 53/80 705/305 |
| 2017/0282713 | A1 | 10/2017 | Devries et al. |
| 2017/0313189 | A1 | 11/2017 | Walter et al. |
| 2018/0011068 | A1 | 1/2018 | Lyon |
| 2018/0091930 | A1 | 3/2018 | Jefferies |
| 2018/0101721 | A1 | 4/2018 | Nienhouse |
| 2018/0170207 | A1* | 6/2018 | Ko ...................... H02J 7/00712 |
| 2018/0209955 | A1 | 7/2018 | Moeller |
| 2019/0246958 | A1 | 8/2019 | Moeller et al. |
| 2019/0376949 | A1 | 12/2019 | Lyon |
| 2020/0361314 | A1 | 11/2020 | Ringgenberg et al. |
| 2021/0148892 | A1 | 5/2021 | Ruland et al. |
| 2021/0156834 | A1 | 5/2021 | Devries et al. |
| 2022/0061767 | A1* | 3/2022 | Goldstein ............ H04R 1/1025 |
| 2022/0315008 | A1 | 10/2022 | Smith et al. |

OTHER PUBLICATIONS

Car Batteries and Ignition Interlock Devices Mass RMV Lawyer (Year: 2018).*

Ignition_Interlock_Lockout_Code_Instructions_Smart_Start.pdf (Year: 2021).*

"Car Batteries and Ignition Interlock Devices," Posted Apr. 1, 2018, available online at https://rmvlawyer.com/car-batteries-and-ignition-interlock-devices (4 pages).

"Non-Final Office Action," for U.S. Appl. No. 17/217,572 dated Jan. 30, 2023 (43 pages).

"Screenshots From Online Portal System for Users of Intoxalock Ignition Interlock Devices, captured Jan. 2018".

"Response to Non Final Office Action," for U.S. Appl. No. 17/217,572, filed Apr. 20, 2023 (10 pages).

"Notice of Allowance," for U.S. Appl. No. 17/217,572 dated Jul. 18, 2023 (14 pages).

* cited by examiner

Detecting an electrical parameter associated with an electrical power state of a vehicle electrical system comprising an ignition interlock device (IID) that includes at least a relay device and a controller device electrically interconnected within the vehicle electrical system
310

Comparing, responsive to the detecting, the electrical parameter to a threshold condition
320

Inferring an IID circumvention event in accordance with the electrical parameter being either above or below the threshold condition.
330

Reporting, responsive to the inferring, the IID circumvention event to a central monitoring server computing system
340

METHOD AND SYSTEM OF ANTI-CIRCUMVENTION MONITORING IN VEHICLE IGNITION INTERLOCK OPERATION

CROSS-REFERENCE TO RELATED APPLICATIONS

The application is a continuation of, and claims priority to, U.S. patent application Ser. No. 17/217,572 filed Mar. 30, 2021, and entitled "METHOD AND SYSTEM OF ANTI-CIRCUMVENTION MONITORING IN VEHICLE IGNITION INTERLOCK SYSTEM", the content of which are herein incorporated by reference.

TECHNICAL FIELD

The disclosure herein relates to vehicle ignition interlock systems and methods of operation thereof.

BACKGROUND

Vehicles can incorporate a breath alcohol ignition interlock device (IID) to prevent a driver from operating a vehicle while intoxicated with alcohol. Such devices are designed to prevent a driver from starting a motor vehicle when the driver's breath alcohol content (BrAC) is at or above a mandated alcohol concentration threshold. Various jurisdictions have adopted a law providing for use of such ID devices as a sanction for drivers convicted of driving while intoxicated, or as a condition of restoring driving privileges during some probationary period after such offenses. A typical ID device meets guidelines established by the National Highway Traffic Safety Administration (NHTSA) in published model specifications for IIDs, which specify various tests that such a device must pass to make it an effective and reliable deterrent to intoxicated driving.

Such a sanctioned driver is proscribed from attempting to circumvent functioning of the IID system in the manner intended, including, but not limited to, untimely and impermissible disconnection or modification of IID device and related system components of the vehicle. A circumvention attempt, once detected, can trigger automatic reporting of the II) circumvention attempt to an IID state agency charged with enforcing mandated ID usage.

SUMMARY

In a first aspect, a method performed in a processor can include detecting an electrical parameter associated with an electrical power state of a vehicle electrical system in a vehicle. The vehicle can include an ignition interlock device that includes at least a relay device and a controller device electrically interconnected within the vehicle electrical system. The method can further include measuring a rate of degradation associated with the electrical parameter of the vehicle electrical system, comparing the electrical parameter to a threshold condition, generating an ignition interlock device violation state based on the electrical parameter being one of above and below the threshold condition, and after generating the ignition interlock device violation state, comparing the rate of degradation of the electrical parameter to a threshold rate, reversing the ignition interlock device violation state upon determining that the rate of degradation can be below the threshold rate, and maintaining the ignition interlock device violation state upon determining that the rate of degradation can be above the threshold rate.

In a second aspect, in addition to one or more of the preceding or following aspects, or in the alternative to some aspects, the step of reversing the ignition interlock device violation state can be performed by the ignition interlock device.

In a third aspect, in addition to one or more of the preceding or following aspects, or in the alternative to some aspects, the method can further include reporting the ignition interlock device violation state to a central monitoring server.

In a fourth aspect, in addition to one or more of the preceding or following aspects, or in the alternative to some aspects, the step of reversing the ignition interlock device violation state can be performed by the central monitoring server.

In a fifth aspect, in addition to one or more of the preceding or following aspects, or in the alternative to some aspects, the central monitoring server can be managed by a service provider, and wherein the step of comparing the rate of degradation of the electrical parameter to a threshold rate can be performed by the service provider.

In a sixth aspect, in addition to one or more of the preceding or following aspects, or in the alternative to some aspects, the service provider analyzes one or more factors surrounding the ignition interlock device violation state and either reverses or maintains the ignition interlock device violation state based on the one or more factors surrounding the ignition interlock device violation state.

In a seventh aspect, in addition to one or more of the preceding or following aspects, or in the alternative to some aspects, the one or more factors include any of passing breath alcohol test results, failed breath alcohol test results, service center appointments, and vehicle movement data.

In an eighth aspect, in addition to one or more of the preceding or following aspects, or in the alternative to some aspects, the vehicle movement data can be acquired from a GPS module housed in the ignition interlock device.

In a ninth aspect, in addition to one or more of the preceding or following aspects, or in the alternative to some aspects, wherein generating the ignition interlock device violation state includes initiating a timed countdown to the ignition interlock device placing the vehicle in an inoperative state.

In a tenth aspect, in addition to one or more of the preceding or following aspects, or in the alternative to some aspects, the method can further include notifying a vehicle operator that the timed countdown can have been initiated.

In an eleventh aspect, in addition to one or more of the preceding or following aspects, or in the alternative to some aspects, initiating the timed countdown includes moving up a service center appointment from an original date to a closer date.

In a twelfth aspect, in addition to one or more of the preceding or following aspects, or in the alternative to some aspects, reversing the ignition interlock device violation state includes moving back the service center appointment from the closer date to the original date.

In a thirteenth aspect, a method performed in a processor can include detecting an electrical parameter associated with an electrical power state of a vehicle electrical system in a vehicle. The vehicle can include an ignition interlock device that includes at least a relay device and a controller device electrically interconnected within the vehicle electrical system. The method can further include measuring a rate of degradation associated with the electrical parameter of the vehicle electrical system, comparing the electrical parameter to a threshold condition, comparing the rate of degradation of the electrical parameter to a threshold rate based on the electrical parameter being one of above and below the threshold condition, generating an ignition interlock device violation state upon determining that the rate of degradation can be above the threshold rate, and generating a log entry upon determining that the rate of degradation can be below the threshold rate.

In a fourteenth aspect, in addition to one or more of the preceding or following aspects, or in the alternative to some aspects, the method can further include transmitting the log entry to a central monitoring server.

In a fifteenth aspect, in addition to one or more of the preceding or following aspects, or in the alternative to some aspects, the method can further include generating an alert based on the electrical parameter being one of above and below the threshold condition.

In a sixteenth aspect, in addition to one or more of the preceding or following aspects, or in the alternative to some aspects, the ignition interlock device can be in communication with an external user interface and the step of generating the alert includes displaying a message on one or both of a display of the ignition interlock device and the external user interface.

In a seventeenth aspect, in addition to one or more of the preceding or following aspects, or in the alternative to some aspects, the electrical parameter can be a voltage state of a battery of the vehicle.

In an eighteenth aspect, in addition to one or more of the preceding or following aspects, or in the alternative to some aspects, the threshold condition can be the voltage state of the battery being 10 V, and the step of comparing the rate of degradation of the electrical parameter to a threshold rate can be performed when the electrical parameter can be below 10 V.

In a nineteenth aspect, in addition to one or more of the preceding or following aspects, or in the alternative to some aspects, the method can further include generating an alert on a display of the ignition interlock device that battery can be low.

In a twentieth aspect, in addition to one or more of the preceding or following aspects, or in the alternative to some aspects, the step of detecting the electrical parameter can be performed at least once every two hours when the vehicle can be not running.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

DETAILED DESCRIPTION

Embodiments herein recognize that IID devices can be hacked or tampered with. For example, an impaired driver can attempt to alter or inhibit, such as by electrical or mechanical means, proper functioning of the IID device within a vehicle electrical system that incorporates the IID.

Among other benefits and technical effects, embodiments herein provide a method and system of deploying supervisory monitoring of alcohol impairment that is less subject to reports of driver violations that might be spuriously ascribed to a circumvention attempt, and more accurately notifying or alerting a monitoring remote server station of possible violations in a real-time basis with regard to a driver's mandated usage of an IID in accordance with probation conditions. Yet further, embodiments herein provide a method and system for immediate, real-time confirmation upon detecting an IID circumvention event in violation of an existing probation order that prohibits operation of a vehicle by an impaired driver.

Embodiments herein recognize that interruptions in vehicle power supply to an IID are typically detected for reporting to state authorities as being caused by a proscribed ID circumvention attempt, such circumvention attempt being ascribed to the driver subject to an IID mandate and constituting a violation of such mandate. Embodiments herein provide for classifying and reporting only a subset of such detected vehicle power interruptions as constituting violations, advantageously avoiding, or minimizing, spurious reporting of violations that are likely to adversely affect a driver subject to the II) mandate.

Provided is a method of detecting an anti-circumvention attempt within a vehicle ID system. The method comprises detecting an electrical parameter associated with an electrical power state of a vehicle electrical system in a vehicle comprising an ignition interlock device that includes at least a relay device and a controller device electrically interconnected within the vehicle electrical system; comparing, responsive to the detecting, the electrical parameter to a threshold condition; inferring an IID circumvention event in accordance with the electrical parameter being one of above and below the threshold condition, and reporting, responsive to the inferring, the II) circumvention event to a central monitoring server computing system.

In embodiments, the reporting includes, in conjunction with the IID circumvention event, II) account information associated with the IID. In other embodiments, the reporting can include reporting, to the central monitoring server computing system, the vehicle lockout state in conjunction with the II) account and a timestamp associated with the generating.

In some aspects, a vehicle lockout state can be generated at the ID, indicating or confirming that the vehicle is rendered inoperative based at least in part on the IID circumvention event.

In some embodiments, the electrical parameter comprises a rate of degradation associated with the electrical power state of the vehicle electrical system, where the vehicle electrical system includes a battery power supply source. In related embodiments, the electrical power state can be such as a voltage state and a current draw state of the battery.

The threshold condition can be such as a rate of degradation of the electrical power state that differentiates between a relatively instantaneous loss of electrical power and a more gradual loss thereof.

In some particular example embodiments, the more gradual loss of electrical power comprises a voltage degradation rate less than 1 volt per minute, and the relatively instantaneous loss of electrical power can be a voltage degradation rate exceeding 1 volt per second.

In embodiments, detecting the electrical parameter can be based, at least in part, on one or more analog to digital converter voltage sensors acquiring data indicating a voltage potential across opposite polarity terminals of the battery.

Also provided is an ignition interlock device (IID) including a processor and a non-transitory memory including instructions. The instructions when executed in the processor cause operations comprising detecting an electrical parameter associated with an electrical power state of a vehicle electrical system in a vehicle comprising the IID, the IID including at least a relay device and a controller device electrically interconnected within the vehicle electrical system; comparing, responsive to the detecting, the electrical parameter to a threshold condition; inferring an IID circumvention event in accordance with the electrical parameter being one of above and below the threshold condition; and reporting, responsive to the inferring, the IID circumvention event to a central monitoring server computing system.

Further provided is a non-transitory computer readable memory storing instructions executable in a processor device. The instructions when executed in the processor cause operations comprising detecting an electrical parameter associated with an electrical power state of a vehicle electrical system in a vehicle comprising an ignition interlock device, the IID including at least a relay device and a controller device electrically interconnected within the vehicle electrical system; comparing, responsive to the detecting, the electrical parameter to a threshold condition; inferring an IID circumvention event in accordance with the electrical parameter being one of above and below the threshold condition; and reporting, responsive to the inferring, the IID circumvention event to a central monitoring server computing system.

Embodiments described herein can be implemented using programmatic modules, through the use of instructions that are executable by one or more processors. A programmatic module can include a program, a sub-routine, a portion of a program, or a software component or a hardware component capable of performing one or more stated tasks or functions. As used herein, a programmatic module can exist on a hardware component independently of other modules or components, or can be a shared element of other modules, programs or machines.

Some embodiments of IIDS described herein can generally incorporate computing and communication resources, such as processor and memory resources. Memory, processing, and network resources, local or remote but communicatively accessible, may be applied in connection with the establishment, use, or performance of any embodiment described herein, including with the performance of any method or with the implementation of any system.

One or more embodiments described herein provide that methods, techniques, and actions performed by an II) based monitoring device are performed programmatically, or as a computer-implemented method. Programmatically, as used herein, means through the use of code or computer-executable instructions. These instructions can be stored in one or more memory resources accessible to the IID based monitoring device.

Device and System

Figure 1:
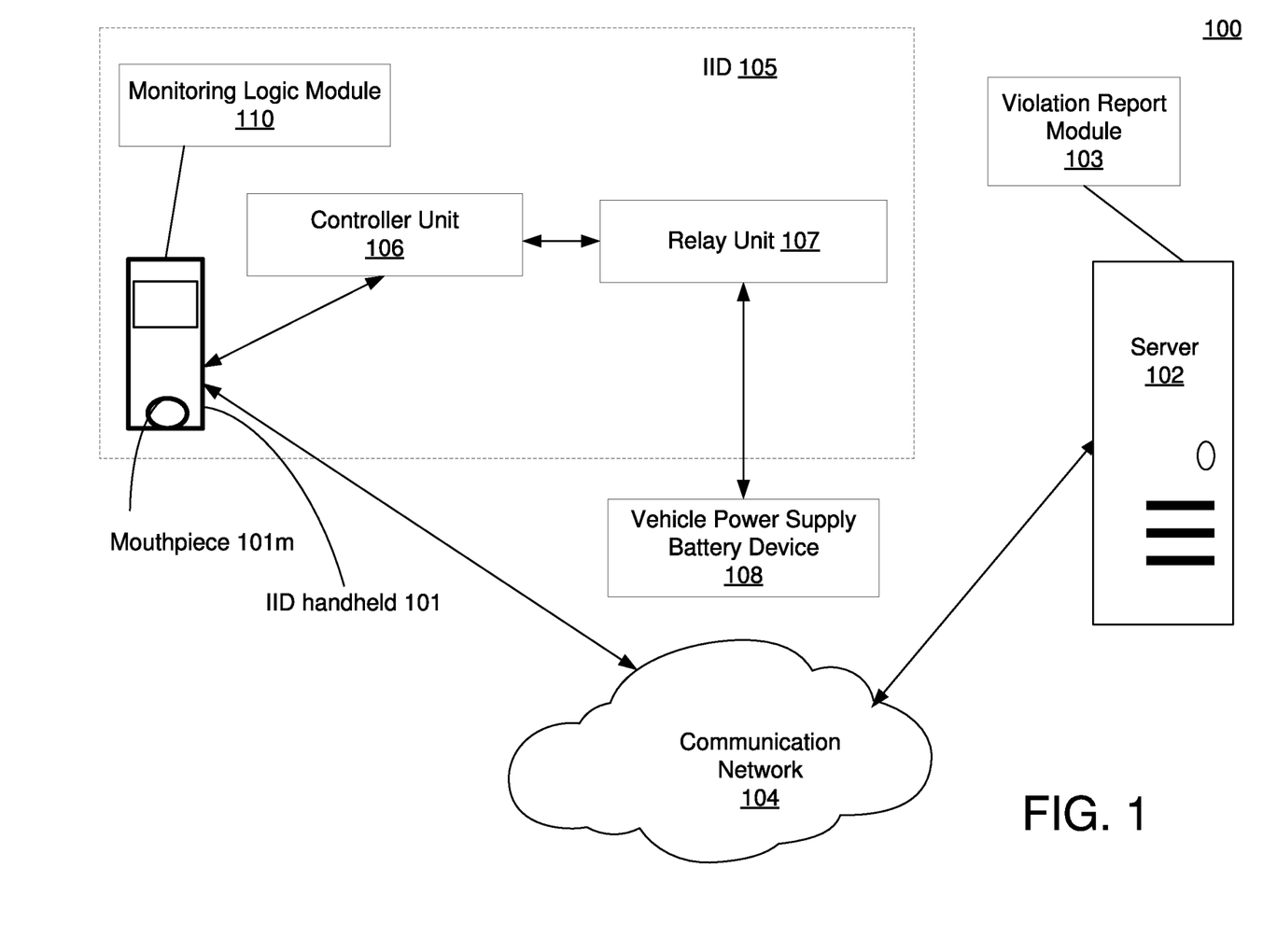
FIG. 1 illustrates, in an example embodiment, a vehicle IID system incorporating anti-circumvention monitoring within a computing and communication system.

FIG. 1 illustrates, in an example embodiment, a vehicle II) system 100 incorporating anti-circumvention monitoring within a computing and communication system. IID handheld 101 includes a processor and a memory. The memory stores executable instructions, constituting monitoring logic module 110 for deploying II) handheld 101 in reporting a user violation, related to prohibition on driving a vehicle, to violation report module 103 of server computing device 102 via communication network 104. In variations, some portions, or all, of the executable instructions constituting monitoring logic module 110 may be hosted at violation report server 102 in communication with IID handheld 101 via communication network 104. Violation report module 103 of violation report server 102 includes logic related to storing IID and driver account details, including driver identification and history of usage of the II) associated with the particular driver and driver account. In some variations, violation report module 103 of violation report server 102 can be managed and maintained in deployment by an IID services provider, and allows reporting of driver and related IID violations to state authorities. In some embodiments herein, BrAC measurements from a user breath sample received at a mouthpiece 101$m$ of ID handheld 101 can be correlated with blood alcohol content (BAC) levels, and a violation report can also be triggered based on either of a measured BrAC or a correlating BAC. It is contemplated that such BrAC and BAC correlations may be performed either locally at IID handheld 101 or at violation report server 102.

In one particular embodiment of IID 105 as depicted in FIG. 1, IID handheld 101 can be communicatively interfaced with controller unit 106 and relay unit 107. Relay unit 107 can directly interface with a vehicle engine ignition system in order to operationally disable the vehicle in response to BAC measurements being above the proscribed or mandated threshold level. Operational electrical power for some or all components of IID 105 as depicted can be sourced from vehicle power supply battery device 108. Although ID handheld 101, controller unit 106 and relay unit 107 are depicted in FIG. 1 as separate modules, it is contemplated that some or all functionality of the separate modules thereof can be integrated and physically incorporated into less than the 3 separate modules as illustrated. Furthermore the communication between one or more modules may be deployed using physically wired connections, wireless connections such as, but not necessarily limited to, Bluetooth, and any combination of wired and wireless communications. In one embodiment, IID 105 can be communicatively interfaced with the vehicle engine system via an on-board diagnostic (OBD) port using a wireless communication protocol such as, but not necessarily limited to, Bluetooth.

Figure 2:
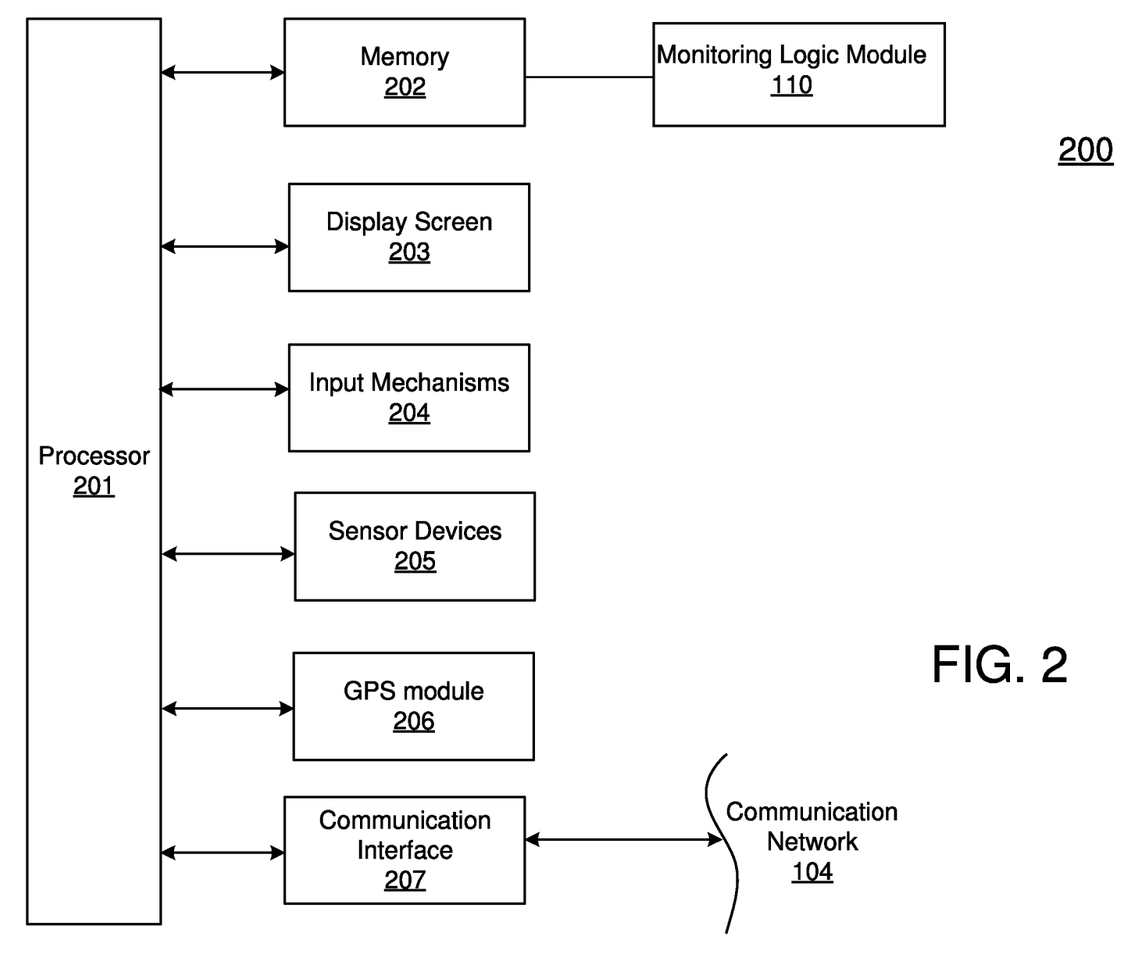
FIG. 2 illustrates, in one embodiment, an example architecture of a vehicle IID system incorporating anti-circumvention monitoring within a computing and communication system.

FIG. 2 illustrates, in one embodiment, example architecture 200 of a vehicle ID system 100 that incorporates anti-circumvention monitoring within a computing and communication system. In one embodiment, IID handheld 101 can include input mechanisms 204 such as resistive- or capacitance-based input mechanisms or software-implemented touchscreen input functionality, audible alerts capability, and sensor devices 205. Input mechanisms 204 may also include breath sample mouthpiece 101$m$ to receive, at ID handheld 101, a breath sample submitted by a user. IID handheld 101 may also include capability for detecting and communicatively accessing wireless communication signals, including but not limited to any of Bluetooth, Wi-Fi, RFID, and global positioning system (GPS) signals, and incorporate communication interface 207 for communicatively coupling to communication network 104, such as by sending and receiving cellular and GPS data over data channels and voice channels. IID handheld 101 can incorporate GPS module 206 that includes GPS receiver and transmitter circuitry for accessing and enabling GPS signals and data.

Sensor devices 205 of IID handheld 101 can include an alcohol fuel cell sensor. Breath alcohol testing and monitoring devices are operated by a user blowing into a mouthpiece 101*m* of the device. The breath alcohol testing and monitoring device 101 incorporates an alcohol-sensing element such as a fuel cell sensor that measures alcohol content of the driver's breath, thereby providing an objective representation or estimate of the blood alcohol concentration of the driver's bloodstream. The monitoring device reads an electrical signal generated from the fuel cell, or similar alcohol-sensing element, and determines whether an operator's breath alcohol content exceeds some pre-designated threshold amount. If the operator's breath alcohol content does not exceed the threshold, the operator is determined as not intoxicated or impaired. If the breath sample delivered from the user registers a higher breath alcohol content than the predetermined allowable threshold, IID handheld 101 generates, records and reports an impaired driving violation.

Sensor devices 205 can further include digital imaging sensors for incorporating digital imaging capability at IID handheld 101.

Monitoring logic module 110 can be constituted of computer processor-executable code stored in memory 202 of IID handheld 101 for deploying functionality ascribed to embodiments herein. In one variation, monitoring logic module 110 may be stored in memory 202 upon subsequent accessing and downloading, via communication network 104, from violation report server 102 or other third party remote server.

In particular embodiments, monitoring logic module 110 includes instructions executable in processor 210 to detect an electrical parameter associated with an electrical power state of a vehicle electrical system in a vehicle comprising an ignition interlock device 105 that includes at least a relay device and a controller device electrically interconnected within the vehicle electrical system.

In embodiments, the vehicle electrical system can include a battery as a vehicle power source, and the electrical power state can be either, or a combination, of a voltage state and a current draw state as measured, or otherwise indicated, across the battery terminals. In some embodiments, the electrical parameter can be a rate of degradation associated with the electrical power state, determined in accordance with the voltage state or current draw state changes of the vehicle electrical system over a given time duration.

In some embodiments, the detecting can be based at least in part on one or more analog to digital converter voltage sensors acquiring data associated with a voltage potential or current draw state of the vehicle electrical system or any component subset thereof, as powered by vehicle power supply battery device 108.

In embodiments, the electrical parameter can be a rate of degradation rate of a voltage loss or a current draw condition as measured in relation to the vehicle power supply battery device 108 (also referred to herein as battery 108).

Monitoring logic module 110 further includes executable instructions to compare, responsive to the detecting, the electrical parameter to a threshold condition. In embodiments, the threshold condition can be stored in memory 202 of IID handheld 101. In alternate embodiments, the threshold condition can be stored in a memory of violation report server 102.

The threshold condition can be a predetermined value of a degradation rate of a voltage loss or a current draw condition in relation with vehicle power supply battery 108. In principle, the threshold condition can be established as a rate of degradation of the electrical power state that differentiates between a relatively instantaneous loss of electrical power and a more gradual loss thereof.

Monitoring logic module 110 also includes executable instructions to infer an IID circumvention event in accordance with the electrical parameter being either above or below the threshold condition. A more instantaneous loss of IID or vehicle power can be indicative of an attempted or successful disablement of the IID with the vehicle system. In contrast, a relatively gradual loss of vehicle or IID electrical power can be attributed to causes other than a circumvention attempt via driver-initiated disablement, due to, but not necessarily limited to, older and partially malfunctioning components of the vehicle electrical system, and even from extreme prevailing weather conditions.

In some example embodiments, when the voltage potential is sampled at a rate of every 30 seconds or more frequently, the more gradual loss of electrical power comprises a voltage degradation rate less than 1 volt per minute, and the relatively instantaneous loss of electrical power comprises a voltage degradation rate exceeding 1 volt per second. In other embodiments, the threshold condition may not be fixed, but can be dynamically determined and adjusted, for instance across different voltage ranges being attained or crossed during a degradation in voltage potential as measured across the terminals of vehicle power supply battery 108. The different voltage ranges, in some embodiments, can range from, but not necessarily limited to, 12V to 9V, and from 9V to under 9V.

Monitoring logic module 110 also includes executable instructions to report, responsive to the inferring, the IID circumvention event to a central monitoring server computing system.

In additional embodiments, the reporting can include, in conjunction with the IID circumvention event, IID account information associated with the IID. In additional variations, the reporting to the central monitoring server computing system can also include establishment of a vehicle lockout state in conjunction with the IID account and a timestamp indicating an event time associated with generating the lockout state. The vehicle lockout state can indicate or confirm that the vehicle is rendered inoperative based at least in part on the IID circumvention event. In some embodiments, the reporting is generated via the IID. The central monitoring server can be maintained at an IID provider service or a state monitoring authority, in embodiments.

Methodology

Figure 3:
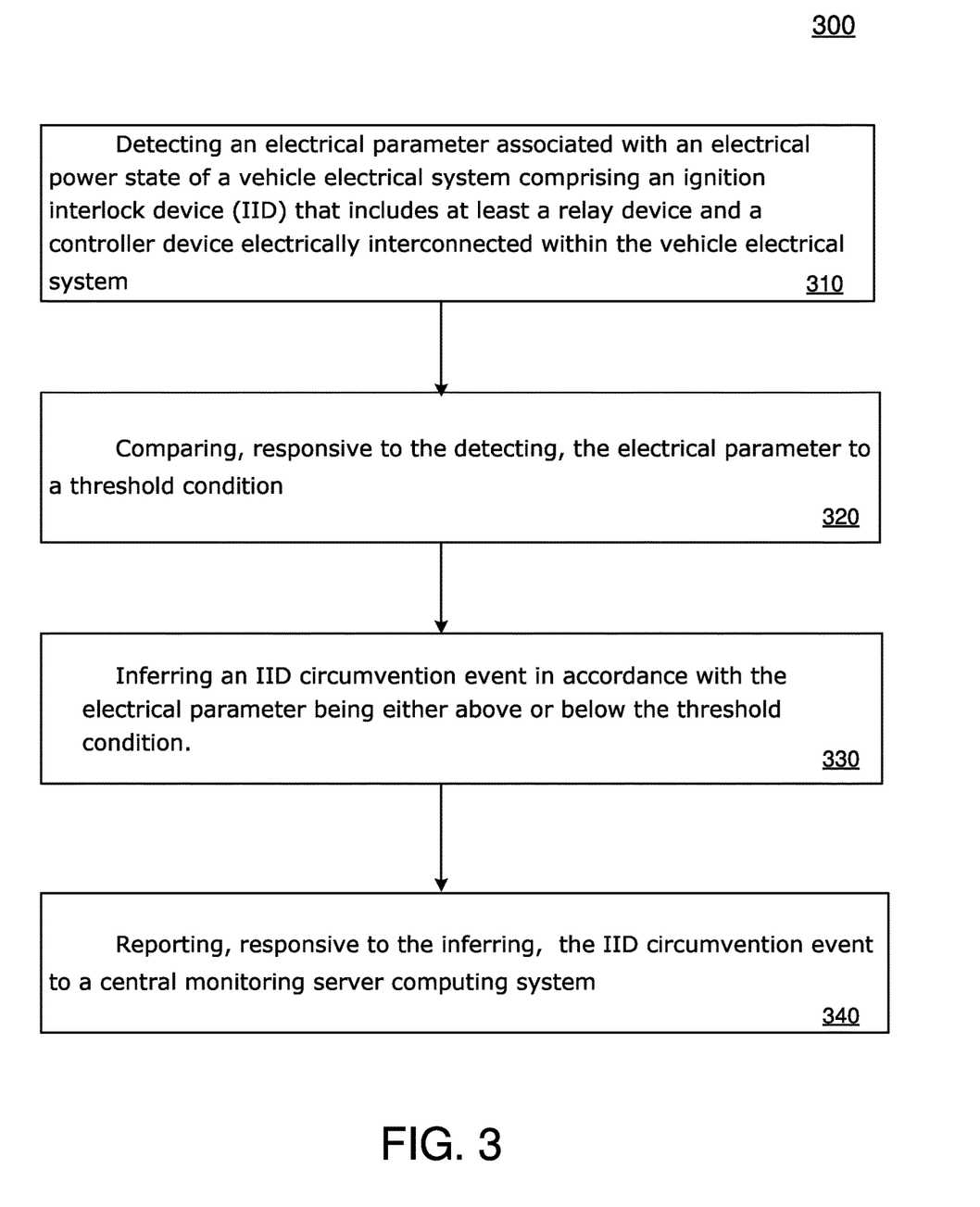
FIG. 3 illustrates, in an example embodiment, a method of anti-circumvention monitoring in deployment of a vehicle IID.

FIG. 3 illustrates, in an example embodiment, method 300 of anti-circumvention monitoring in deployment of a vehicle IID within a computing and communication system. Examples of method steps described herein are related to deployment and use of IID handheld 101 as described herein. According to one embodiment, the techniques are performed in processor 201 executing one or more sequences of software logic instructions that constitute monitoring logic module 110 of IID handheld 101. In embodiments, monitoring logic module 110 may be remotely hosted at violation report server 102, also referred to herein as server 102, and is communicatively coupled with IID handheld 101. Such instructions may be read into memory 202 from machine-readable medium, such as memory storage devices. Executing the instructions of monitoring logic module 110 stored in memory 202 causes processor 201 to perform the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

At step 310, detecting an electrical parameter associated with an electrical power state of vehicle electrical system in a vehicle comprising an ignition interlock device 105 that includes at least a relay device and a controller device electrically interconnected within the vehicle electrical system.

In embodiments, the vehicle electrical system can include a battery as a vehicle power source, and the electrical power state can be either, or a combination, of a voltage state and a current draw state as measured, or otherwise indicated, across the battery terminals. In some embodiments, the electrical parameter can be a rate of degradation associated with the electrical power state, determined in accordance with the voltage state or current draw state changes of the vehicle electrical system over a given time duration.

In some embodiments, the detecting can be based at least in part on one or more analog to digital converter voltage sensors acquiring data associated with a voltage potential or current draw state of the vehicle electrical system or any component subset thereof, as powered by the vehicle battery power supply.

In embodiments, the electrical parameter can be a rate of degradation rate of a voltage loss, or a current draw condition as measured in relation to the vehicle power supply battery device 108 (also referred to herein as battery 108).

At step 320, comparing, responsive to the detecting, the electrical parameter to a threshold condition. In embodiments, the threshold condition can be stored in memory 202 of IID handheld 101. In alternate embodiments, the threshold condition can be stored in a memory of violation report server 102.

The threshold condition can be a predetermined value of a degradation rate of a voltage loss or a current draw condition in relation with vehicle power supply battery 108. In principle, the threshold condition can be established as a rate of degradation of the electrical power state that differentiates between a relatively instantaneous loss of electrical power and a more gradual loss thereof.

At step 330, inferring an IID circumvention event in accordance with the electrical parameter being either above or below the threshold condition. In one embodiment, a more instantaneous loss of IID or vehicle power can be indicative of an attempted or successful disablement of the IID with the vehicle system. On the other hand, a relatively gradual loss of vehicle or IID electrical power can be attributed to causes other than a circumvention attempt via driver-initiated disablement, due to, but not necessarily limited to, older and partially malfunctioning components of the vehicle electrical system, and even from extreme prevailing weather conditions.

In some example embodiments, when the voltage potential is sampled at a rate of every 30 seconds or more frequently, the more gradual loss of electrical power comprises a voltage degradation rate less than 1 volt per minute, and the relatively instantaneous loss of electrical power comprises a voltage degradation rate exceeding 1 volt per second. In other embodiments, the threshold condition may not be fixed, but can be dynamically determined and adjusted, for instance across different voltage ranges being attained or crossed during a degradation in voltage potential as measured across the terminals of vehicle power supply battery 108. The different voltage ranges, in some embodiments, can range from, but not necessarily limited to, 12V to 9V, and from 9V to under 9V.

At step 340, reporting, responsive to the inferring, the IID circumvention event to a central monitoring server computing system 102 (also referred to herein as server 102).

In additional embodiments, the reporting can include, in conjunction with the IID circumvention event, IID account information associated with the IID. In additional variations, the reporting to the central monitoring server computing system can also include establishment of a vehicle lockout state in conjunction with the IID account and a timestamp indicating an event time associated with generating the lockout state. The vehicle lockout state can indicate or confirm that the vehicle is rendered inoperative based at least in part on the IID circumvention event. In some embodiments, the reporting is generated via the IID. The central monitoring server can be maintained at an IID provider service or a state monitoring authority, in embodiments.

In another aspect, the reporting to the central monitoring server computing system can also relate to commencing a timed countdown to vehicle lockout state in conjunction with the IID account and a timestamp indicating an event time associated with the vehicle lockout state. In one embodiment, the timed countdown can occur over, for instance, over a three day period during the vehicle operator is notified of an impending lockout, where the impending vehicle lockout state can indicate that the vehicle will be rendered inoperative based at least in part on the IID circumvention event. In some embodiments, the reporting is generated via the IID. The central monitoring server can be maintained at an IID provider service or a state monitoring authority, in embodiments. In this manner, based on classifying a vehicle power loss event as relatively sudden versus pronouncedly gradual in accordance with the threshold condition of voltage degradation rate, embodiments trigger reporting only a subset of detected vehicle power interruptions as constituting IID circumvention violations, advantageously avoiding, or minimizing, spurious reporting of violations that are likely to adversely affect a driver subject to the IID mandate. In particular embodiments, sudden losses of vehicle power are associated with and reported as an IID circumvention violation, whereas in contrast more gradual vehicle power loss that is detected as occurring at a slower or lesser rate than a threshold condition of voltage degradation rate does not trigger a violation report as being caused by an IID circumvention event.

In another variation, violation report server device 102, includes a processor and a non-transitory memory including instructions for triggering the vehicle countdown state based on a report of an IID circumvention attempt transmitted from the vehicle IID in accordance with embodiments herein.

It is contemplated for embodiments described herein to extend to individual elements and concepts described herein, independently of other concepts, ideas or system, as well as for embodiments to include combinations of elements recited anywhere in this application. For example, although techniques of anti-circumvention monitoring described herein are disclosed in context of alcohol sensor devices and alcohol impaired driving, it is contemplated that such techniques, in conjunction with appropriate, respective sensor devices, be applied to alternate intoxicant agents that result in impaired driving. Such intoxicants can include, but not necessarily be limited to, drugs including cannabinoids, opiates, and methamphetamines.

Alerts and Information

Figure 4:
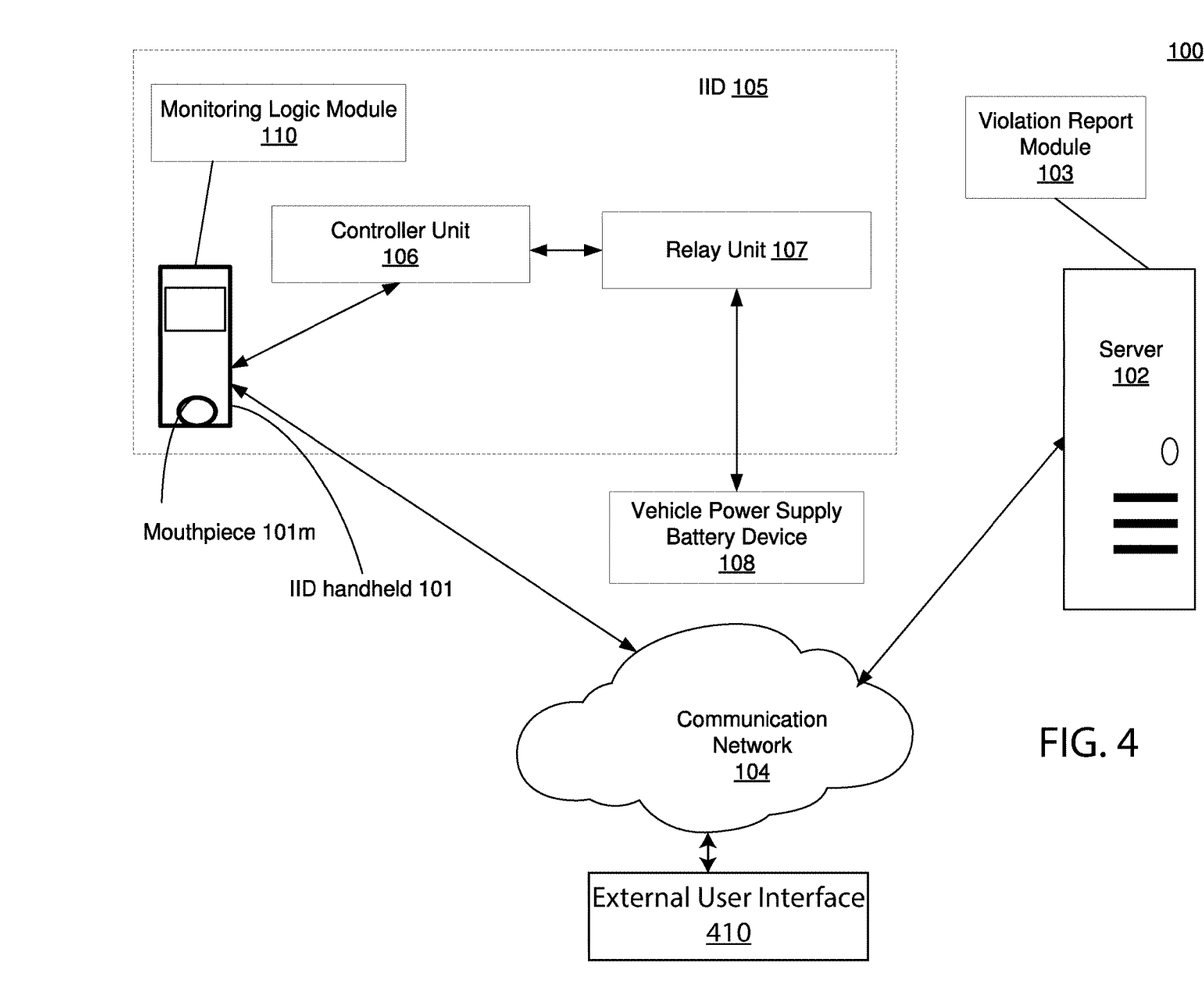
FIG. 4 illustrates, in an example embodiment, a vehicle IID system incorporating anti-circumvention monitoring within a computing and communication system.

FIG. 4 illustrates an alternate example of the vehicle IID system 100 of FIG. 1 in accordance with various embodiments herein. The system of FIG. 4 includes all elements of FIG. 1, but the communications network 104 is additionally connected to an external user interface 410. The external user interface 410 can be any device or devices external to the ignition interlock device through which a user can receive information regarding the ignition interlock device system 100. Suitable external user interfaces include, but are not limited to smart phones, cellular telephones, personal digital assistants, personal computers, wearable devices (e.g., smart watches), or the like.

The communication between the external communications device 410 and the other components of the ID system may be deployed using physically wired connections, wireless connections such as, but not necessarily limited to, Bluetooth, NFC, Wi-Fi, or another suitable wireless protocol, and any combination of wired and wireless communications.

In various embodiments, it can be valuable to provide information regarding an electrical parameter associated with an electrical power state of a vehicle electrical system to a user. Information regarding the electrical parameter may be provided to the user via one or both of a the IID handheld unit 101 and the external user interface 410. Information regarding the electrical parameter may be provided to the user in the form of visual information (words and/or images on a display screen), audible information (words and/or audible tones through a speaker), and/or tactile information (vibrations or patterns of vibrations).

In various embodiments, the IID system 100 is configured to detect the electrical parameter during predefined events. In some embodiments, the ignition interlock checks the voltage state of the vehicle battery each time the ignition is turned on, each time the ignition is turned off, each time a trip begins, each time a trip ends, each time the vehicle is in idle, and/or every time a breath sample is provided to the ID handheld 101.

In various embodiments, the IID system 100 is configured to detect the electrical parameter at predefined time increments while the vehicle is running. In some embodiments, the predefined time increment can be greater than or equal to 1, 4, 7, or 10 minutes. In some embodiments, the predefined time increment can be less than or equal to 30, 23, 17, or 10 minutes. In some embodiments, the predefined time increment can fall within a range of 1 to 30 minutes, or 4 to 23 minutes, or 7 to 17 minutes, or can be about 10 minutes.

In various embodiments, the IID system 100 is configured to detect the electrical parameter at predefined time increments while the vehicle is not running. In some embodiments, the predefined time increment can be greater than or equal to 0.5 hours, 1 hours, 1.5 hours, or 2 hours. In some embodiments, the predefined time increment can be less than or equal to 1 day, 12 hours, 6 hours, or 2 hours. In some embodiments, the predefined time increment can fall within a range of 0.5 hours to 1 day, or 1 hours to 12 hours, or 1.5 hours to 6 hours, or can be about 2 hours.

As previously described, the vehicle electrical system can include a battery as a vehicle power source, and the electrical power state can be either, or a combination, of a voltage state and a current draw state as measured, or otherwise indicated, across the battery terminals. In some embodiments, the electrical parameter can be based at least in part on one or more analog to digital converter voltage sensors acquiring data associated with a voltage potential or current draw state of the vehicle electrical system or any component subset thereof, as powered by vehicle power supply battery device 108.

In one example, the electrical parameter is a voltage state of the vehicle power supply battery device 108. The ignition interlock system is configured to monitor the voltage state of the vehicle power supply battery device 108. With the engine off, the fully charged vehicle power supply battery device voltage 108 will typically measure about 12.6 volts. When the engine is running, the vehicle power supply battery device voltage will typically rise to 13.5 to 14.5 volts.

In some embodiments, it may be pertinent to alert a user if the voltage state of the vehicle power supply battery device 108 drops below a threshold value. In some embodiments, the threshold value can be equal to 12, 11, 10, 9, 8, 7, 6, or 5 Volts, or can be an amount falling within a range between any of the foregoing.

In the event that the vehicle power supply battery device 108 drops below a threshold value, the ID system is configured to notify the user through one or both of the II) handheld 101 and the external user interface 410. In some examples a visual notification may be displayed on one or both of a display screen of the II) handheld 101 and the external user interface 410. The visual notification can include a written message informing the user that the battery voltage has dropped below a threshold value. The visual notification can include a call to action or recommended next steps. Such messages can include any of "Low battery," "Check battery," "Recommend that you drive longer in order to charge your battery," or the like.

The visual alert can include a visual illustrating the voltage state of the vehicle power supply battery device 108. Such a visual could include a graphic representation of a battery. In some embodiments, the battery icon may constantly be displayed on one or both of the II) handheld 101 and the external user interface 410. Alternatively, the battery icon may appear only when the voltage state of the vehicle power supply battery device 108 drops below a threshold value The battery icon may be filled, colored, or shaded to a level indicative of the voltage state of the vehicle power supply battery device 108. Alternatively, the percent charge of the of the vehicle power supply battery device 108 may be displayed on the battery icon. In some embodiments, the battery icon may appear, change colors, and/or flash in the event that the vehicle power supply battery device voltage state drops below a threshold value.

Additionally, or alternatively, an audible notification may be transmitted through on one or both of the II) handheld 101 and the external user interface 410. The audible notification can include a verbal message informing the user that the voltage of the vehicle power supply battery device 108 has dropped below a threshold value, provided a call to action, or providing recommended next steps. Such messages can include any of "Low battery," "Check battery," "Recommend that you drive longer in order to charge your battery," or the like.

Alternatively, the audible notification may be a beep or other tone in the event that the voltage state of the power supply battery device 108 has dropped below a threshold value.

Additionally, or alternatively, a tactile notification may be transmitted through on one or both of the II) handheld 101 and the external user interface 410. The tactile alert can include a vibration or a pattern of vibrations in the event that the voltage state of the vehicle power supply battery device 108 has dropped below a threshold value. While the above examples apply to a voltage state of the vehicle power supply battery, analogous notifications may be generated on one or both of the II) handheld 101 and the external user interface 410 for other electrical parameters.

Additional Methodology

Many different methods are contemplated herein, including, but not limited to, methods of making, methods of using, and the like. Aspects of system/device operation described elsewhere herein can be performed as operations of one or more methods in accordance with various embodiments herein.

In various embodiments, operations described herein, and method steps can be performed as part of a computer-implemented method executed by one or more processors of one or more computing devices. In various embodiments, operations described herein, and method steps can be implemented instructions stored on a non-transitory, computer-readable medium that, when executed by one or more processors, cause a system to execute the operations and/or steps.

Figure 5:
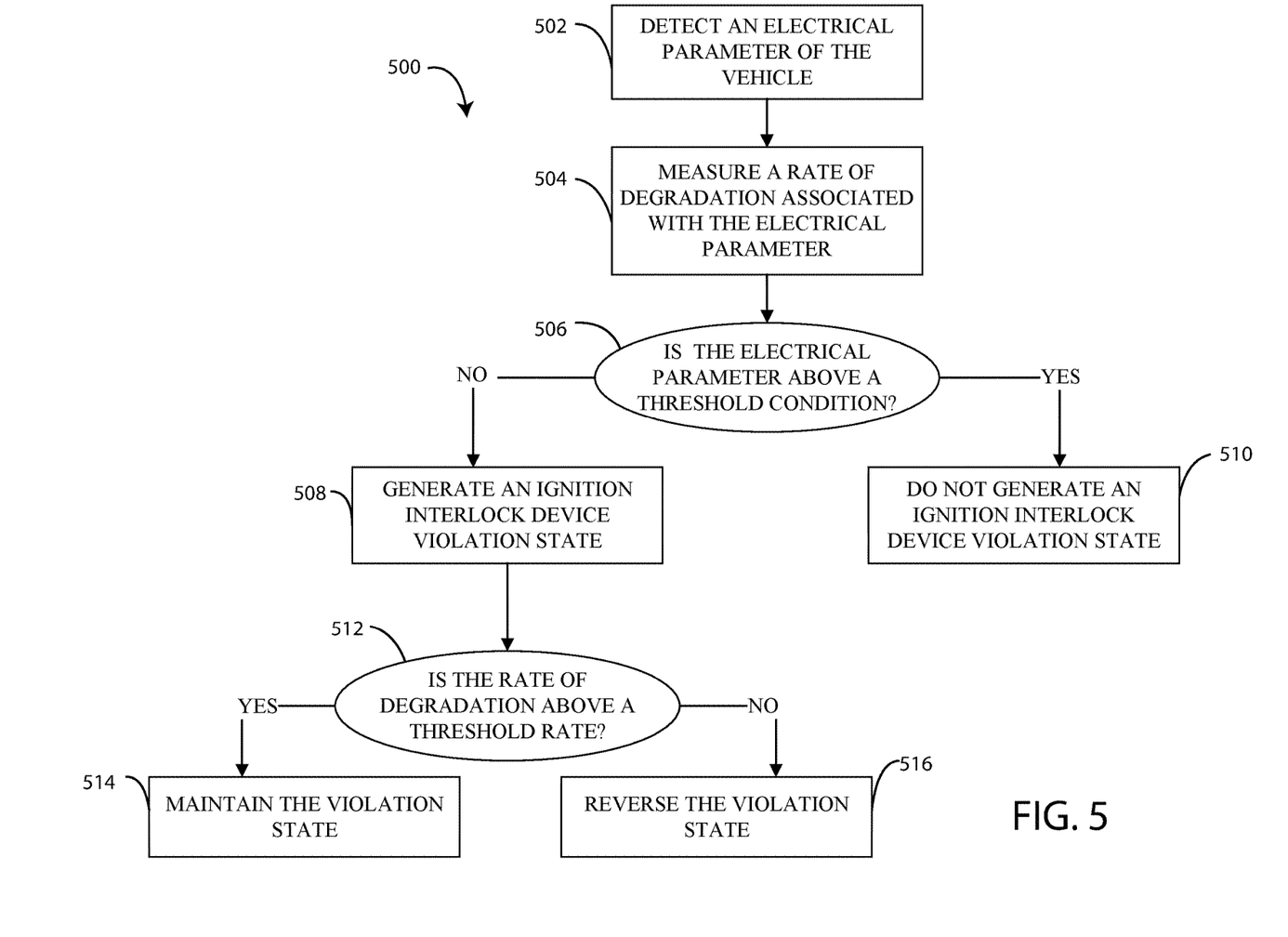
FIG. 5 illustrates, in an example embodiment, a method of anti-circumvention monitoring in deployment of a vehicle IID.

In an embodiment, a method 500 of operating an ignition interlock device system is included. The method 500 can include the step 502 of detecting an electrical parameter associated with an electrical power state of a vehicle electrical system in a vehicle. In various embodiments, the vehicle can include an ignition interlock device that includes at least a relay device and a controller device electrically interconnected within the vehicle electrical system. In some embodiments, the electrical parameter can be a voltage state, or a current draw condition as measured in relation to the vehicle power supply battery device. In some embodiments, detecting the electrical parameter can be based at least in part on one or more analog to digital converter voltage sensors acquiring data associated with a voltage potential or current draw state of the vehicle electrical system or any component subset thereof, as powered by the vehicle battery power supply.

The method 500 can include the step 504 of measuring a rate of degradation associated with the electrical parameter of the vehicle electrical system. In various embodiments, the electrical parameter is measured at multiple predetermined time intervals and/or events and a rate of degradation is measured by analyzing the change of the electrical parameter over time.

The method 500 can include the step 506 of comparing the electrical parameter to a threshold condition. In one example, where the electrical parameter is the voltage state of the vehicle power supply battery device, the threshold condition can be that the vehicle power supply battery device has a voltage greater than or equal to 12, 11, 10, 9, 8, 7, 6, or 5 Volts, or can be an amount falling within a range between any of the foregoing.

The method 500 can include the step 508 of generating an ignition interlock device violation state if the electrical parameter is below a threshold condition. Although, it should be noted that the inverse is also possible and in alternative embodiments, the ignition interlock device violation state is generated if the electrical parameter is at or above a threshold condition.

In various embodiments, the ID system requires a minimum amount power from the vehicle battery to function properly. In one example, the electrical parameter is the voltage state of the vehicle power supply battery device. In such cases, events where the voltage state of the vehicle power supply battery device drops below a threshold value can indicate an issue with the vehicle and/or the IID system or can be indicative of a circumvention attempt by the vehicle operator. One example of a circumvention attempt is unplugging one or more portions of the interlock system from the vehicle. Consequentially, a violation state is generated when the voltage state of the of the vehicle power supply battery device falls below a threshold condition.

In some embodiments, step 508 may further include reporting the ignition interlock device violation state to a central monitoring server. In some embodiments, step 508 may further include. logging the violation state in the memory of the II) system. In some embodiments, step 508 may further include notifying the user of the violation state through the II) handled and/or the external user interface.

In some embodiments, step 508 may further include placing the vehicle in an inoperative state. In some embodiments, step 508 may further initiate a timed countdown to the ignition interlock device placing the vehicle in an inoperative state. In an embodiment, the method can further include notifying a vehicle operator that the timed countdown has been initiated through the IID handled and/or the external user interface. In some embodiments, an ignition interlock device must be taken in for service at a service center at prescribed time intervals and initiating the timed countdown can entail moving up a service center appointment from an original date to a closer date.

The method 500 can include the step 510 of not generating an ignition interlock device violation state if the electrical parameter is above a threshold condition. In one example, the electrical parameter is the voltage state of the vehicle power supply battery device and a voltage state at or above a threshold value is indicative of a normally functioning ignition interlock system.

After generating the ignition interlock device violation state in step 508, the method 500 can include the step 512 of comparing the rate of degradation of the electrical parameter to a threshold rate. In some embodiments, step 512 may be performed locally at the ignition interlock device, such as by the monitoring logic module of the interlock device. Alternatively, step 512 may be performed at the central monitoring server. In some embodiments, step 512 is performed automatically at the central monitoring server. In some embodiments, the central monitoring server is managed by a service provider, and the step of comparing the rate of degradation of the electrical parameter to a threshold rate is performed manually or semi-automatically by the service provider.

The method 500 can include the step 514 of maintaining the ignition interlock device violation state upon determining that the rate of degradation is above the threshold rate. In one example, the electrical parameter is the voltage state of the vehicle power supply battery device and a more rapid rate of degradation of the voltage state can be indicative of an attempted or successful disablement or disconnection of the IID from the vehicle system. In some embodiments, the relatively instantaneous loss of electrical power can be a voltage degradation rate exceeding 1 volt per second.

The method 500 can include the step 516 of reversing the ignition interlock device violation state upon determining that the rate of degradation is below the threshold rate. In one example, the electrical parameter is the voltage state of the vehicle power supply battery device and a more gradual rate of degradation of the voltage state can be attributed to causes other than a circumvention attempt via driver-initiated disablement, due to, but not necessarily limited to, older and partially malfunctioning components of the vehicle electrical system, and even from extreme prevailing weather conditions. In some embodiments, the more gradual loss of electrical power comprises a voltage degradation rate less than 1 volt per minute.

In an embodiment of the method, reversing the ignition interlock device violation state includes any of restoring vehicle functionality, reversing the timed countdown, and moving back the service center appointment from the closer date to the original date. In an embodiment of the method, reversing the ignition interlock device violation state includes providing a lockout code to the user to enter into an interface of the IID. In an embodiment, the method can further include notifying a vehicle operator that the violation state has been reversed through the IID handled and/or the external user interface. For instance, II) handled and/or the external user interface may display a message such as "Lockout reversed" or "Service date was changed. Previous service date restored."

In some embodiments, steps 514 and 516 may be performed locally at the ignition interlock device, such as by the monitoring logic module of the interlock device. Alternatively, steps 514 and 516 may be performed at the central monitoring server. In some embodiments, steps 514 and 516 is performed automatically at the central monitoring server. In some embodiments of the method, the central monitoring server is managed by a service provider, and wherein reversing or maintaining the violation state is performed manually or semi-automatically by the service provider.

In various some embodiments, the service provider or an algorithm may take into account one or more factors surrounding the ignition interlock device violation state and either reverse or maintain the ignition interlock device violation state based on the one or more factors surrounding the ignition interlock device violation state. In an embodiment of the method, the one or more factors comprise any of passing breath alcohol test results, failed breath alcohol test results, service center appointments, and vehicle movement data. In an embodiment of the method, the vehicle movement data is acquired from a GPS module housed in the ignition interlock device. In one example, having the vehicle started or moved without a breath alcohol sample or with a breath alcohol level over a threshold close in time (for example, within 1 hour, within 2 hours, or within 1 day) to the loss of power is a strong indicator of a successful circumvention attempt, and leads to declaring or maintaining a violation state in various embodiments. On the other hand, a recent record of passing breath alcohol samples followed by vehicle starts indicates that the irregular electrical parameter is not a result of a circumvention attempt and leads to the violation state being reversed or not initiated. In another example, a recent servicing appointment can indicate that vehicle service work is the cause of the loss of power instead of a circumvention attempt and leads to the violation state being reversed or not initiated.

Figure 6:
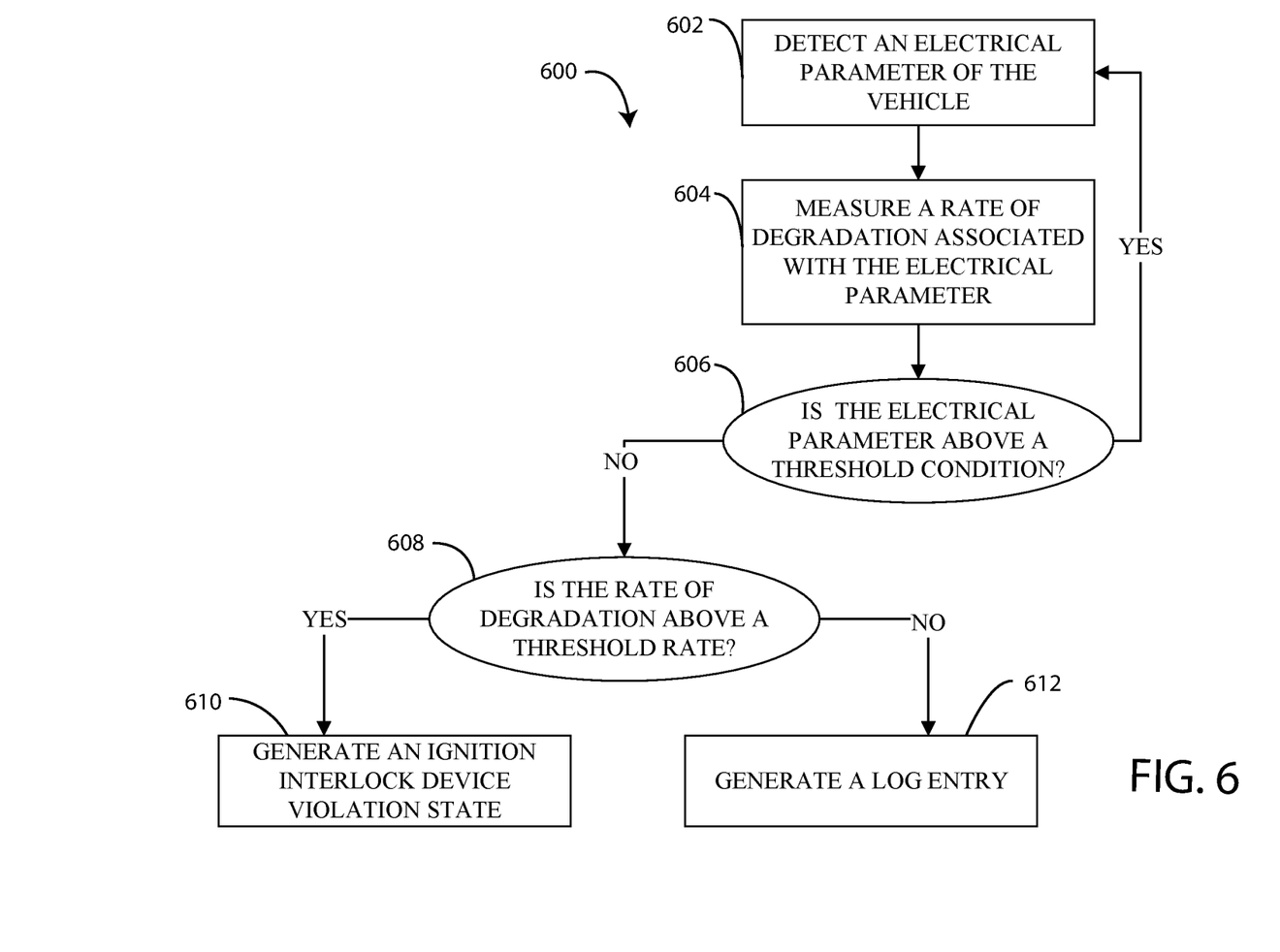
FIG. 6 illustrates, in an example embodiment, a method of anti-circumvention monitoring in deployment of a vehicle IID.

Referring now to FIG. 6, a method 600 of operating an ignition interlock device system is included. Method 600 differs from method 500 in that a violation state is not generated until the rate of degradation has been compared to a threshold. This can be beneficial in reducing the number of violation states generated for non-circumvention related events.

The method 600 can include the step 602 of detecting an electrical parameter associated with an electrical power state of a vehicle electrical system in a vehicle. In various embodiments, the vehicle can include an ignition interlock device that includes at least a relay device and a controller device electrically interconnected within the vehicle electrical system. In some embodiments, the electrical parameter can be a voltage state, or a current draw condition as measured in relation to the vehicle power supply battery device. In some embodiments, detecting the electrical parameter can be based at least in part on one or more analog to digital converter voltage sensors acquiring data associated with a voltage potential or current draw state of the vehicle electrical system or any component subset thereof, as powered by the vehicle battery power supply.

The method 600 can include the step 604 of measuring a rate of degradation associated with the electrical parameter of the vehicle electrical system. In various embodiments, the electrical parameter is measured at multiple predetermined time intervals and/or events and a rate of degradation is measured by analyzing the change of the electrical parameter over time.

The method 600 can include the step 606 of comparing the electrical parameter to a threshold condition. In one example, where the electrical parameter is the voltage state of the vehicle power supply battery device, the threshold condition can be that the vehicle power supply battery device has a voltage greater than or equal to 12, 11, 10, 9, 8, 7, 6, or 5 Volts, or can be an amount falling within a range between any of the foregoing.

The method 600 can include the step 606 of comparing the rate of degradation of the electrical parameter to a threshold rate if the electrical parameter is below a threshold value. The method can include returning to step 602 and continuing to monitor the electrical parameter if the rate of degradation is above threshold rate. Although, it should be noted that the inverse is also possible and in alternative embodiments, the method returns to step 602 if the rate of degradation is below a threshold rate.

The method 600 can include the step 610 generating an ignition interlock device violation state upon determining that the rate of degradation is above the threshold rate in step 608. As previously discussed, a more rapid rate of degradation of a vehicle electrical parameter may be indicative of a circumvention attempt.

The method 600 can include the step 612 of generating a log entry upon determining that the rate of degradation is below the threshold rate in step 608. The log entry may indicate that the rate of degradation was below the threshold rate. The log entry can further indicate to a reviewer that a loss of power was likely due to equipment failure of the vehicle's power system instead of due to a circumvention attempt by the user. Step 606 may further include generating an alert based on the electrical parameter being one of above and below the threshold condition. Generating the alert may include displaying a message on one or both of a display of the ignition interlock device and the external user interface.

Although embodiments are described in detail herein with reference to the accompanying drawings, it is contemplated that the disclosure herein is not limited to only such literal embodiments. As such, many modifications including variations in sequence of the method steps in conjunction with varying combinations of user interface features disclosed herein will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments. Thus, the absence of describing combinations of such do not preclude the inventor from claiming rights to such combinations.

The invention claimed is:

1. A method performed in a processor, the method comprising:
    detecting an electrical parameter associated with an electrical power state of a vehicle electrical system in a vehicle comprising an ignition interlock device that includes at least a relay device and a controller device electrically interconnected within the vehicle electrical system;
    measuring a rate of degradation associated with the electrical parameter of the vehicle electrical system;
    comparing the electrical parameter to a threshold condition;
    generating an ignition interlock device violation state based on the electrical parameter being one of above and below the threshold condition; and
    after generating the ignition interlock device violation state, comparing the rate of degradation of the electrical parameter to a threshold rate;
    reversing the ignition interlock device violation state upon determining that the rate of degradation is below the threshold rate; and
    maintaining the ignition interlock device violation state upon determining that the rate of degradation is above the threshold rate.

2. The method of claim 1, wherein the step of reversing the ignition interlock device violation state is performed by the ignition interlock device.

3. The method of claim 1, further comprising reporting the ignition interlock device violation state to a central monitoring server.

4. The method of claim 3, wherein the step of reversing the ignition interlock device violation state is performed by the central monitoring server.

5. The method of claim 4, wherein the central monitoring server is managed by a service provider, and wherein the step of comparing the rate of degradation of the electrical parameter to a threshold rate is performed by the service provider.

6. The method of claim 5, wherein the service provider analyzes one or more factors surrounding the ignition interlock device violation state and either reverses or maintains the ignition interlock device violation state based on the one or more factors surrounding the ignition interlock device violation state.

7. The method of claim 5, wherein the one or more factors comprise any of passing breath alcohol test results, failed breath alcohol test results, service center appointments, and vehicle movement data.

8. The method of claim 5, wherein the vehicle movement data is acquired from a GPS module housed in the ignition interlock device.

9. The method of claim 1, wherein generating the ignition interlock device violation state comprises initiating a timed countdown to the ignition interlock device placing the vehicle in an inoperative state.

10. The method of claim 9, further comprising notifying a vehicle operator that the timed countdown has been initiated.

11. The method of claim 9, wherein initiating the timed countdown comprises moving up a service center appointment from an original date to a closer date.

12. The method of claim 11, wherein reversing the ignition interlock device violation state comprises moving back the service center appointment from the closer date to the original date.

13. A method performed in a processor, the method comprising:
    detecting an electrical parameter associated with an electrical power state of a vehicle electrical system in a vehicle comprising an ignition interlock device that includes at least a relay device and a controller device electrically interconnected within the vehicle electrical system;
    measuring a rate of degradation associated with the electrical parameter of the vehicle electrical system;
    comparing the electrical parameter to a threshold condition;
    comparing the rate of degradation of the electrical parameter to a threshold rate based on the electrical parameter being one of above and below the threshold condition; and
    generating an ignition interlock device violation state upon determining that the rate of degradation is above the threshold rate;
    generating a log entry upon determining that the rate of degradation is below the threshold rate.

14. The method of claim 13, further comprising transmitting the log entry to a central monitoring server.

15. The method of claim 13, further comprising generating an alert based on the electrical parameter being one of above and below the threshold condition.

16. The method of claim 15, wherein the ignition interlock device is in communication with an external user interface and the step of generating the alert comprises displaying a message on one or both of a display of the ignition interlock device and the external user interface.

17. The method of claim 13, wherein the electrical parameter is a voltage state of a battery of the vehicle.

18. The method of claim 17, wherein the threshold condition is the voltage state of the battery being 10 V, and the step of comparing the rate of degradation of the electrical parameter to a threshold rate is performed when the electrical parameter is below 10 V.

19. The method of claim 18, further comprising generating an alert on a display of the ignition interlock device that battery is low.

20. The method of claim 13, wherein the step of detecting the electrical parameter is performed at least once every two hours when the vehicle is not running.

* * * * *